United States Patent Office 2,890,202
Patented June 9, 1959

2,890,202

METHOD OF PREPARING ACRYLATE ESTERS OF EPOXY RESINS

Earl E. Parker, Milwaukee, Wis., assignor to Pittsburgh Plate Glass Company, Pittsburgh, Pa., a corporation No Drawing. Application July 20, 1953
Serial No. 369,248

1 Claim. (Cl. 260—47)

This invention relates to a novel class of ethylenically unsaturated esters and to methods of forming the same and it has particular relation to the preparation of a novel ester of an acrylic acid and a bis(phenol) substituted alkane or a polyether of such phenolic compound and glycerine. These esters are valuable for use as potting resins such as are employed to embed or pot electrical coils. They are also characterized by relatively high resistance to distortion when heated, as compared with the epoxy type resins.

The first mentioned component of the ester products comprises a compound of a class such as acrylic acid, methacrylic acid, and derivatives thereof obtained by replacement of hydrogen by chlorine, methyl, ethyl or similar groups which in the compounds are of non-functioning character. They usually comprise the group:

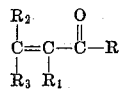

where R is —OH, halogen, or similar group, adapted to react by esterification with a hydroxyl or epoxy group. The groups $R^1$, $R^2$ and $R^3$ usually are hydrogen atoms, but one or more of them may be methyl, ethyl, chlorine or other non-functioning group.

The acid is esterified with a bisphenol substituted aliphatic hydrocarbon, or preferably with a polyether of such bisphenol compound and glycol, or preferably glycerine. The polyether should contain residual hydroxyls and/or epoxy groups. In these polyether derivatives, alcoholic hydroxyls are attached to the phenyl radicals through the ether linkages. These compounds may be represented by the approximate formula:

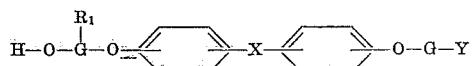

The benzene rings may be directly joined together, but preferably, they are linked as shown in the formula by bridging group X. In the formula, the group X may be hydrocarbon, and notably open chain or aliphatic hydrocarbon (containing 1–10 carbon atoms) or derivatives thereof, obtained by replacement of hydrogen by chlorine or other non-functioning groups. Groups G can be aliphatic hydrocarbon such as ethylene, propylene, isopropylene, or an ether chain thereof, and may be regarded as the hydrocarbon portion of glycerine or a glycol such as propylene glycol or an ether portion of a condensed glycol such as diethylene glycol, triethylene glycol, polyethylene glycol. $R_1$ can be hydrogen, chlorine, or it can be essentially a prolongation of, or repetition of the groups

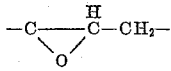

or structures represented in the formula. Y can be hydroxyl, or a further repetition of the units of the formula in a polymer structure. In any event, it should terminate in a group capable of reaction by esterification.

Suitable dihydroxy phenol compounds for use in the practice of the invention are represented by bis-phenol A or bis-phenol B, which are respectively p,p'-isopropylidene diphenol and p,p'-secondary butylidene diphenol. Preparation of these starting materials is described in U.S. Patent 2,463,982. Other dihydric phenols having the hydroxyls on different benzene rings may be employed. A partial list of polynuclear phenols suitable for etherification with epoxy compounds and epichlorohydrin includes bis(4-hydroxyphenyl)2,2-propane; 4,4'-dihydroxy benzophenone; bis(4-hydroxyphenyl)1,1-ethane; bis(4-hydroxyphenol)1,1-isobutane; bis(4-hydroxyphenyl)2,2-butane; bis(4-hydroxy 2-methyl phenyl)2,2-propane; bis-(4-hydroxy 2-tertiary butyl phenyl)2,2-propane; bis(2-dihydroxy naphthyl) methane; 1,5-dihydroxy naphthalene and others.

Hydroxy diphenyls in which the benzene rings are directly joined and which may undergo reaction with epichlorohydrin to form polyethers with available alcoholic —OH groups and/or epoxy groups, include 4,4'-hydroxy diphenyl; 4,4'-hydroxy 3,3'-dimethyl diphenyl; 4,4'-hydroxy 3,3-propyl diphenyl; 4,4'-hydroxy 3,3'-isopropyldiphenyl; 4,4'-hydroxy 3,3'-butyldiphenyl. These have hydroxyls on separate, uncondensed benzene rings.

It has previously been proposed to prepare long chain ether derivatives of these propylidene diphenols by reaction with epichlorohydrin to form a compound which includes structures such as are represented by the following formula:

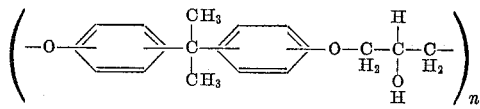

In the formula, $n$ is an integer repeated a number of times dependent upon the degree of resinification of the compound. The chain thus formed may be terminated at one or both ends by an epoxy group:

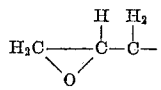

or a hydroxyl. In this formula, the intermediate linkages constituting residues of glycerol molecules include a hydroxyl which is capable of esterification reaction with acrylyl chlorides.

Somewhat similar compounds of lower molecular weight can also be obtained by reacting isopropylidene diphenol, or isobutylidene diphenol or a sodium salt thereof, with a chlorohydrin such as the chlorohydrin of propylene glycol. As a result of such reaction, compounds having such structures as are represented by the following formula are obtained:

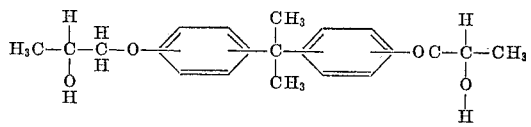

This compound may be termed 2,2-bis(phenyl para oxyisopropanol) propane. The compound is much like the first mentioned compound except that it does not include a repetition of the basic unit.

In preparing the latter types of compounds, chlorohydrin of ethylene glycol may be substituted for the chlorohydrin of propylene glycol. Likewise di-ethylene glycol and tri-ethylene glycol (or the derivatives thereof in which chlorine replaces an OH group) could be employed. The hydroxyls are available to react with acrylic or methacrylic compounds.

Many mixed hydroxy polyethers from dihydric phenols and epichlorohydrin and similarly reacting compounds, and being capable of esterification reaction with acrylyl and methacrylyl chlorides have been described in the prior art, some of these, for example, are mentioned in Patents 2,592,560; 2,506,486; 2,464,758; 2,302,363; 2,060,715 and others.

Acrylic and methacrylic acid esters of the foregoing hydroxy substituted compounds may be prepared in various ways. However, the most convenient method is presently regarded as involving the reaction of an acrylyl chloride such as methacrylyl-chloride, previously referred to, at moderate temperatures with an appropriate compound of the type above described, such as 2,2-bis(phenyl oxyisopropanol) propane, or an ether thereof, as above described.

The following examples illustrate the application of such method to the preparation of esters of methacrylic acid and dihydric phenols having the hydroxyls in separate benzene rings, or alcoholic compounds obtained by resinification of such dihydric phenols with epichlorohydrin. A convenient commercial form of the latter type material is sold under the trade name of Epon resin. Sill another commercial form is sold under the trade name of Araldite. They all include the basic structures previously described and comprise alcoholic hydroxys attached at various points along the groups inter-connecting the bis(phenyl) alkane radicals.

*Example I*

In this example, 175 grams of resin which was a reaction product of bis-phenol A as described and epichlorohydrin and which was known as Epon 1004, was reacted with 116 grams of methacrylyl chloride. The latter constituted a 10 percent excess of that theoretically required to react with the Epon 1004. The mixture was dissolved in 200 grams of methyl ethyl ketone and was then refluxed at 80° C. for 8 hours. At the end of that time, the evolution of hydrogen chloride gas had subsided, thus indicating that the reaction was approaching a conclusion. The excess methacrylyl chloride and the solvent were distilled off under reduced pressure and there was obtained as a residue a soft, balsam-like material. This product had the typical methacrylate ester odor.

13.3 gram portion of the foregoing balsam-like material was admixed with 6.7 grams of styrene and 0.6 gram of benzoyl peroxide (a catalyst of addition reaction).

In a second example, 20 grams of the same balsam-like material was mixed with 0.6 gram of benzoyl peroxide, without inclusion of a monomer. The two mixtures were then poured into vials which were heated one hour at 170° F., and an additional hour at 250° F. Solid castings were obtained which were of Rockwell hardness of M100 and M55–63 respectively.

A third sample of material similar to the second sample was diluted with the acetate of the monoethyl ether of ethylene glycol until a solids contect of 50 percent by weight was obtained. This solution was then flowed out on a glass panel which was baked at 400° F. for 15 minutes. The film was hard, brittle, and very adhesive. The film could be redissolved when acetone was poured on it.

*Example II*

A fourth sample of the balsam-like ester material was dissolved in 50 percent of acetate of monoethyl ether of ethylene glycol and 1 percent by volume of a commercial paint dryer comprising cobalt naphthenate (1.25 percent metal in naphtha) was added. The solution was spread out on a glass panel and was baked thereupon at 400° F. The film was acetone-soluble.

In a fifth test of the material, a 50 percent resin solution was again prepared and to this was added 3 percent by weight of so-called Luperco ATC as a catalyst. Luperco ATC comprised 50 percent by weight of benzoyl peroxide in tricresyl phosphate. The resultant solution was flowed out on a glass panel and was then baked at 400° F. for 1 hour. The resulting film was insoluble in acetone or a mixture of equal parts of the monoethyl ether of ethylene glycol and toluene.

*Example III*

In this example 516 grams of 2,2-bis(p-phenyl ethoxy-2-propanol) propane was employed as a starting material. This material was mixed with 314 grams of methacrylyl chloride and 100 grams of methylethylketone (solvent). The mixture was refluxed at 80° to 85° C. for 8 hours, or until hydrogen chloride gas ceased to evolve. The solvent was then distilled off under vacuum and an amber-colored, mobile resin remained. This material could be catalyzed with benzoyl peroxide or other peroxide catalysts of polymerization, or with catalysts of the type employed as siccatives in paints and varnishes for the hardening of films of drying oils. These latter materials are oil-soluble salts of such metals as cobalt, nickel, manganese or the like and acids such as oleic acid, stearic acid, naphthenic acids or the like. The material can be spread as films and baked as previously described or it can also be employed to form castings.

An application of the principles of the invention to the formation of a casting was conducted as follows: A 20 gram sample of the preceding resin was mixed with 0.6 gram of benzoyl peroxide. The mixture was poured into a vial which was heated at 170° F. for 1 hour and at 250° F. for an additional hour. The resultant casting had a Rockwell hardness of M–40. Its properties were as follows:

| | |
|---|---:|
| Water absorption, 24 hours at 77° F. __percent__ | 0.18 |
| Flexural strength _____p.s.i__ | 3664 |
| Modulus _____p.s.i__ | 71,000 |
| Tensile strength _____p.s.i__ | 3038 |

*Example IV*

A mixture comprising 114 grams of bisphenol A, 110 grams methacrylyl chloride and 100 grams xylene (solvent) was prepared and heated at 80° C. for eight hours until the evolution of hydrogen chloride subsided. Excess methacrylyl chloride and the xylene were distilled under vacuum. The product was a mobile, amber, syrup-like resin.

A 20 gram portion of this resin was mixed with 0.6 gram of benzoyl peroxide and was heated in a vital at 210° F. for 1 hour and at 250° F. for an additional hour to provide a hard casting.

It will be appreciated that the several esters of acrylic or methacrylic acid disclosed in these examples can be mixed with various compatible monomers containing an ethylenic group, preferably in terminal position attached to a negative group or radical such as phenyl, carboxyl, —Cl or the like and interpolymerized therewith to produce modified resins, often of greater hardness than obtained from the polymerized esters without monomers.

Appropriate monomers include styrene, alpha methyl styrene, vinyl toluene, esters such as vinyl acetate, methylacrylate, methyl methacrylate, allyl acrylate, allyl acetate, diallyl phthalate, diallyl succinate, halides such as vinyl chloride, vinylidene chloride, acrylyl chloride, nitriles such as acrylonitrile and many others. These may be used singly and in mixtures of two and more, in proportions within the limits of mutual compatibility.

Monomers may be added in a proportion of 1 to 60 percent by weight based upon the total mixture.

It is also within the purview of this invention to prepare esters of acrylic or methacrylic acids and hydroxy ethers or epoxy ethers of phenols contining the group:

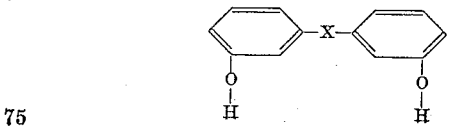

where X is aliphatic hydrocarbon and then to incorporate these as monomers with compatible polyesters of alpha-beta ethylenic, alpha-beta dicarboxylic acids such as the polyesters of propylene glycol and maleic acid or mixtures of maleic acid and saturated dicarboxylic acids such as phthalic acid or adipic acid. Many appropriate polyesters are available and some of them are mentioned in Parker Patent 2,593,787. The two types of resins, when to be mixed, should be chosen for compatibility and fluidity at least at elevated temperatures such as 100° or 150° C. Catalysts and gelation inhibitors such as are disclosed in the Parker patent may be employed in the mixtures.

It will be appreciated that the acrylyl and methacryl esters of bisphenols and the mixed hydroxy polyethers of bisphenols, with or without monomers, are capable of passing from fluid to a solid state by cross-linking, addition reactions and without liberation of water or similar byproducts in situ. This is often advantageous, as the problem of removing such byproducts is thus avoided.

The forms of the invention herein illustrated are to be understood as being by way of example. It will be apparent to those skilled in the art that numerous modifications may be made therein without departure from the spirit of the invention or the scope of the appended claim.

What is claimed is:

A method of forming a resinous material which is adapted to interpolymerize with a monomer containing a $>C=CH_2$ group and being selected from the class consisting of:

Styrene
Alpha methyl styrene
Vinyl toluene
Vinyl acetate
Methyl acrylate
Methyl methacrylate
Allyl acetate
Diallyl phthalate
Diallyl succinate
Vinyl chloride
Vinylidene chloride
Acrylonitrile the monomer being present in an amount of 1 to 60 percent by weight based upon the mixture, which comprises heating together a mixture of a compound of a class consisting of acrylylchloride and methacrylylchloride and an epoxy resin which is a polyether obtained by reaction of a bis(hydroxyphenyl)alkane and epichlorohydrin.

References Cited in the file of this patent

UNITED STATES PATENTS

| | | |
|---|---|---|
| 2,129,685 | Graves | Sept. 13, 1938 |
| 2,331,265 | Coleman et al. | Oct. 5, 1943 |
| 2,456,408 | Greenlee | Dec. 14, 1948 |
| 2,575,440 | Bradley | Nov. 20, 1951 |

UNITED STATES PATENT OFFICE
CERTIFICATE OF CORRECTION

Patent No. 2,890,202                                                                    June 9, 1959

Earl E. Parker

It is hereby certified that error appears in the printed specification of the above numbered patent requiring correction and that the said Letters Patent should read as corrected below.

Column 2, line 6, for the patent number "2,463,982" read -- 2,468,982 -- column 3, line 21, for "Sill" read -- Still --; line 24, for "hydroxys" read -- hydroxyls --; line 43, before "13.3 gram" insert -- A --; line 56, for "contect" read -- content --; column 4, line 45, for "vital" read -- vial --.

Signed and sealed this 22nd day of March 1960.

(SEAL)
Attest:

KARL H. AXLINE
Attesting Officer

ROBERT C. WATSON
                                                                                 Commissioner of Patents